United States Patent
Kruppa

(10) Patent No.: US 8,092,311 B2
(45) Date of Patent: Jan. 10, 2012

(54) BEARING ARRANGEMENT IN A UNIVERSAL JOINT

(75) Inventor: Martin Kruppa, Herzogenaurach (DE)

(73) Assignee: Schaeffler KG (DE)

( * ) Notice: Subject to any disclaimer, the term of this patent is extended or adjusted under 35 U.S.C. 154(b) by 1028 days.

(21) Appl. No.: 11/572,551

(22) PCT Filed: Jun. 25, 2005

(86) PCT No.: PCT/EP2005/006876
§ 371 (c)(1),
(2), (4) Date: Jan. 18, 2008

(87) PCT Pub. No.: WO2006/010420
PCT Pub. Date: Feb. 2, 2006

(65) Prior Publication Data
US 2011/0136579 A1    Jun. 9, 2011

(30) Foreign Application Priority Data
Jul. 24, 2004   (DE) .................. 10 2004 036 105

(51) Int. Cl.
*F16D 3/40* (2006.01)
(52) U.S. Cl. .......................................... 464/130
(58) Field of Classification Search ........... 464/128–130
See application file for complete search history.

(56) References Cited

U.S. PATENT DOCUMENTS

| | | | | |
|---|---|---|---|---|
| 4,540,386 A | * | 9/1985 | Kampf | 464/130 |
| 5,352,079 A | | 10/1994 | Croskey et al. | |
| 5,797,800 A | | 8/1998 | Rhoades et al. | |
| 6,336,868 B1 | | 1/2002 | Kurecka et al. | 464/134 |
| 2003/0224862 A1 | * | 12/2003 | Schultze | |

FOREIGN PATENT DOCUMENTS

| | | | | |
|---|---|---|---|---|
| BE | 469 209 A | | 12/1946 | |
| CH | 358 633 A | | 11/1961 | |
| CH | 358 633 A | * | 1/1962 | 464/130 |
| DE | 710 596 C | | 9/1941 | |
| FR | 894 783 A | | 1/1945 | |
| GB | 1 230 078 A | | 4/1971 | |

OTHER PUBLICATIONS

International Search Report PCT/EP2005/006876 dated Dec. 14, 2005 (European Patent Office NL).

* cited by examiner

*Primary Examiner* — Gregory Binda
(74) *Attorney, Agent, or Firm* — Ostrolenk Faber LLP

(57) ABSTRACT

A bearing arrangement for a universal joint including a securing ring which is inserted in an annular groove of a universal-joint yoke with a form fit is arranged such that it can be adjusted. In this case, both the securing ring and an associated contact surface on a base of the universal joint bush have a contact surface which rises helically.

11 Claims, 2 Drawing Sheets

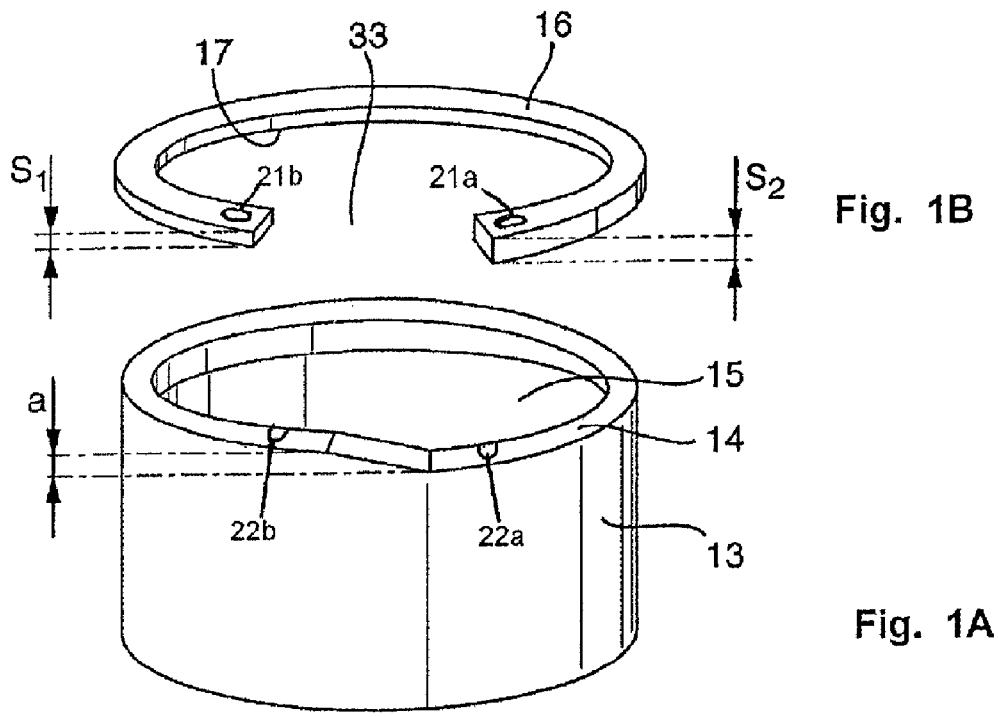
Fig. 1B
Fig. 1A
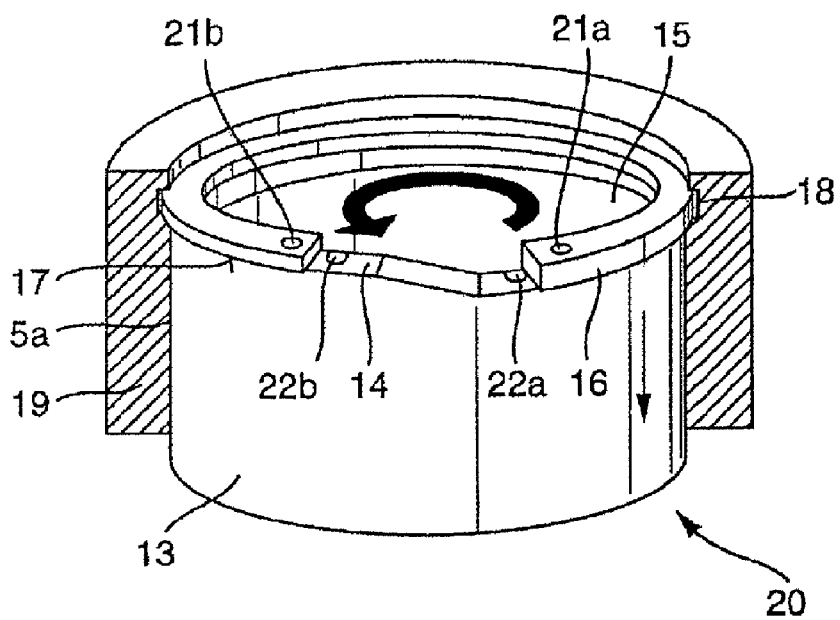
Fig. 1C

BEARING ARRANGEMENT IN A UNIVERSAL JOINT

CROSS REFERENCE TO RELATED APPLICATION

The present application is a 35 U.S.C. §§371 national phase conversion of PCT/EP2005/006876, filed 25 Jun. 2005, which claims priority of German Patent Application No. 10 2004 036 105.3, filed 24 Jul. 2004, the disclosures of which are herein incorporated by reference. The PCT International Application was published in the German Language

FIELD OF THE INVENTION

The present invention relates to a bearing arrangement in a universal joint between two shaft sections which are rotatable at an angle of inclination. The universal joint is formed by two yokes which are arranged at the ends of the shafts and are connected via a cross trunnion assembly. In this case, each trunnion of the cross trunnion assembly is guided in a cylindrical receptacle of the yoke via a universal joint bush, with a securing ring which is inserted in an annular groove of the receptacle ensuring axial securing of the universal joint bush and at the same time defining the installation position thereof.

BACKGROUND OF THE INVENTION

A universal joint is intended to make it possible to drive a first shaft at an angle to a second shaft. The universal joint comprises a cross trunnion assembly from which in each case two opposite trunnions are pressed into receptacles of a yoke by means of universal joint bushes, with a bearing arrangement being formed. In order to obtain a low-friction mounting, the trunnions of the cross trunnion assembly are mounted with rolling contact in the universal joint bushes via needle bearings. This construction permits each yoke to pivot about its own axis in relation to the trunnion of the cross trunnion assembly during a transmission of torque between two shafts which are oriented at an angle of inclination and are connected via the universal joint. For the operation of the universal joint and in order to obtain a long service life of the same, in particular a precise orientation of the cross trunnion assembly in relation to the axis of rotation is crucial. This makes it possible to avoid a disadvantageous unbalance of the universal joint and therefore of the entire drive train.

In order to adjust universal joints, tolerance compensation is required, with the build-up of the tolerances of the individual parts, such as: yoke, width of the annular grooves for receiving the securing ring, thickness of the base of the universal joint bush, trunnion length of the cross trunnion assembly and the thickness of the securing ring being determined. In order to compensate for these tolerances, securing rings, for example, are sorted into different thicknesses. However, this complex process provides compensation only within the context of the tolerance of the component thickness of the securing rings.

A further method for tolerance compensation makes provision, during fitting, to deform the material of the yoke in the region of the receptacle in such a manner that said material bears against the bush base and the universal joint bush is therefore secured axially. This measure requires special tools for repair work in order, for example, to exchange universal joint bushes. In addition, the deformation of the material permits only a limited retaining force and therefore inadequate axial force securing for certain applications.

The U.S. Pat. No. 5,797,800 shows the bearing arrangement of a universal joint, in which, in order to secure the universal joint bush and the cross trunnion assembly in the region of the annular groove, material of the yoke is embossed against the securing ring. The retaining force arising in this case is lower than in a conventional installation of the securing ring because of the local, punctiform supporting of the securing ring in the region of the embossings.

According to the U.S. Pat. No. 6,336,868, in order to compensate for play of the securing ring in the universal joint, the yoke is provided with partially projecting protrusions which are deformed after the universal joint bush is pressed into the receptacle intended for it.

The measures known from the U.S. patents for compensating for play bring about a lower retaining force and therefore, disadvantageously for many installation situations, inadequate axial force securing, in particular in comparison to a conventional, customary securing ring fitting.

SUMMARY OF THE INVENTION

Taking the disadvantages of known solutions into consideration, it is the object of the present invention to provide compensation for play in a universal joint bearing arrangement, said compensation making fitting and removal possible using simple means while maintaining the retaining force.

This statement of object is achieved by the securing ring and bushing as described. According thereto, the bearing arrangement according to the invention for a universal joint comprises an adjustable, i.e. displaceable or rotatably arranged securing ring which forms an inclined plane in an axial direction. In the installed state, this securing ring is assigned directly via the inclined plane or indirectly to the base of the universal joint bush. In the installation position, the inclined plane of the securing ring is supported directly on a further corresponding inclined plane.

This measure according to the invention advantageously reduces the amount of sorting of securing rings and therefore the number of securing ring groups required, since a coordination process can be omitted. At the same time, the measure according to the invention achieves freedom of play for the universal joint, in conjunction with fitting symmetry, which is important for the operation, and also a defined, low moment of inclination of the universal joint. For the invention, a fitting sequence is provided, in which first of all the universal joint bush is pressed into the receptacle of the yokes before the securing ring is inserted into the annular groove predetermined for this purpose and, in the process, interacts with a further component via the mutually corresponding, inclined planes. After the securing ring is inserted into the annular groove of the yoke, different spacings can be determined by rotation of the securing ring. For example, between the outer contour of the securing ring or of the base of the universal joint bush and the outer contour of the yoke in the region of the receptacle, in order thereby to permit centering or an adjustment of the symmetry of the universal joint and of the moment of inclination of the universal joint.

This measure improves the smoothness of running of the universal-joint propeller shaft and decisively reduces the outlay on the balancing of the shaft. In the ideal situation, the balancing can even be entirely dispensed with after the universal joint is fitted. For repair of the universal-joint propeller shaft, requiring removal of the universal joint, the radially prestressed securing ring, which is designed as a snap ring, is removed from the annular groove, for example, by means of a pair of pliers. Subsequently, the universal joint bush can be removed without any deformation work from the receptacle of the yoke. It is advantageously appropriate to design a repair kit appropriate for the present invention so as to permit a conventional securing mount to be exchanged.

The play-free adjustment of the universal joint bush in the receptacle of the yoke is advantageously realized by means of the snap ring according to the invention such that the latter forms an inclined plane in an axial direction in the form of a helical line shape which can also be referred to as helix-shaped. This gives rise to a difference in size between the starting point and the end point of the securing ring, which is of slotted design and forms a separating gap. The associated contact surface with which the securing ring interacts has a corresponding, inclined plane designed in a helix-shaped manner corresponding to the securing ring. By rotation of the securing ring in a direction in which the inclined planes of the securing ring and of the associated contact surface accumulate, effective compensation of play can be obtained.

An advantageous refinement of the bearing arrangement makes provision for the universal joint bush to have, on the base, i.e. pointing in the axial direction on the end side, a contact surface which is designed such that it rises in a helix-shaped manner or helical-line-shaped manner. In the installed state of the universal joint bush, this contact surface is operatively connected to the corresponding surface of the securing ring that is likewise designed in a helix-shaped manner.

As an alternative to this, it is provided according to the invention to arrange an intermediate ring which, in the installed state, is inserted between the universal joint bush and the securing ring. In this case, the contact zone running in a helix-shaped or helical-line-shaped manner is formed by the contact regions of the securing ring and of the intermediate ring. To avoid erroneous fitting, it is appropriate to design the intermediate ring such that it corresponds with the securing ring. This construction does not require a position-oriented installation, and so erroneous fitting is ruled out at the same time.

A radially prestressed snap ring which forms a separating gap is preferably used as the securing ring or as the intermediate ring. On account of the contact surface of helix-shaped design and the interaction with a component which has a corresponding contact surface, in the installed state both a radial play is avoided and an effective axial compensation of play is ensured.

In an advantageous manner, the securing ring according to the invention is furthermore provided with measures which simplify fitting and removal, i.e. in particular permit simplified rotation. For this purpose, the securing ring and/or the intermediate ring are/is preferably provided with bores in which the securing ring can be rotated or adjusted by means of a special tool, for example a sickle spanner. As an alternative or in addition, the invention includes knobs or protrusions which, integrally formed on the securing ring, are intended for holding a tool.

The invention furthermore includes a fixing means or a securing means which fixes the securing ring in the final position. An embossing is in particular suitable for this purpose, i.e. a deformation of the material of the yoke in the region of the separation gap of the securing ring and/or of the intermediate ring, thus preventing automatic release. In addition or as an alternative, an adhesive bond between the yoke limb and the securing ring in the region of the annular groove is suitable for securing or fixing the securing ring and/or the intermediate ring.

BRIEF DESCRIPTION OF THE DRAWINGS

Exemplary embodiments of the invention are illustrated in the figures, in which:

FIG. 1A shows a universal joint bush according to the invention of a universal joint;

FIG. 1B shows a support ring supported on the base of which the universal joint bush via an inclined plane;

FIG. 1C shows the universal joint bush and securing ring in the installation position and including bores and knobs.

DETAILED DESCRIPTION OF THE DRAWINGS

Figure 3:
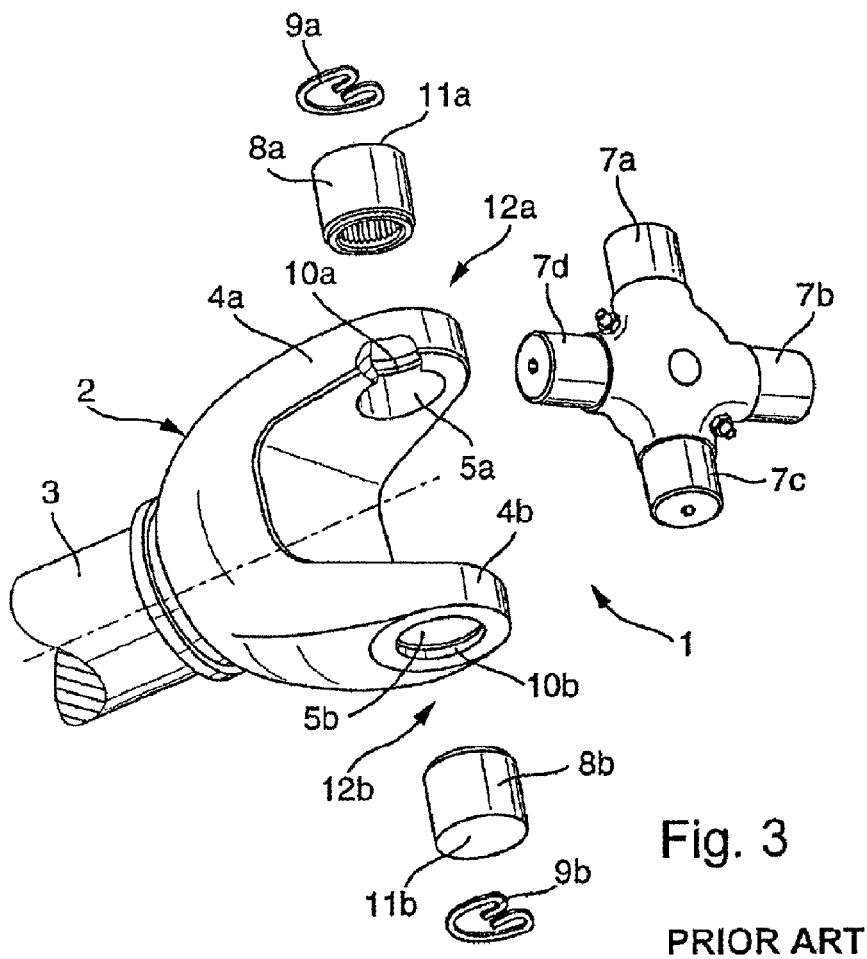
FIG. 3 shows, in an exploded drawing, the construction of a known universal joint.

In order to explain the invention, reference is first of all made to FIG. 3 which, in an exploded drawing, clearly shows all of the individual parts of a known universal joint and therefore at the same time the construction of a bearing arrangement in a universal joint. The universal joint 1 comprises a yoke 2 which is fastened to the end side of a shaft 3 in a rotationally locked manner. In this case, the yoke 2 forms two axially offset yoke limbs 4a, 4b having a respective receptacle 5a, 5b designed in the form of a bore. A cross trunnion assembly 6, which comprises four trunnions 7a to 7d offset in each case by 90° with respect to one another, in the installed state is inserted in the receptacles 5a, 5b of the fork limbs 4a, 4b via the trunnions 7a and 7c. At the same time, the trunnions 7a, 7c are mounted with rolling contact in the universal joint bush 8a, 8b via rolling contact bodies designed as needles. To axially secure the universal joint bushes 8a, 8b, securing rings 9a, 9b are provided and are fitted in a radially prestressed manner and with a non-positive fit into an annular groove 10a, 10b of the receptacle 5a, 5b. In the installation position, the universal joint bushes 8a, 8b are supported in each case via the base 11a, 11b on the securing rings 9a, 9b, which consequently form an axial stop. The cross trunnion assembly 6 is consequently mounted with rolling contact in the yoke 2 via two bearing arrangements 12a, 12b, formed by the universal joint bushes 8a, 8b in conjunction with the trunnions 7a, 7c. Via two further bearing arrangements, of which the trunnions 7b, 7d are illustrated in FIG. 3, the universal joint 1 is connected to an associated, further yoke and shaft which permit a transmission of torque by two shafts arranged at an angle of inclination.

The service life of the universal joint 1 is directly influenced by the quality of the installation position and the installation play of the cross trunnion assembly 6 in relation to the yoke 2. In order to adjust the installation play, according to FIG. 1A the universal joint bush 13 is provided on the end side with a contact surface 14 designed such that it rises in the axial direction. The contact surface 14, which surrounds the end side of the base 15 on the outside and is designed such that it rises in a helix-shaped manner, forms a difference in size "a" between the start and the end of the contact surface 14, which extends virtually over 360°. The securing ring 16 of FIG. 1B, the thickness of which increases from a minimum size "s1" to a maximum size "s2" is designed in accordance with the profile of the contact surface 14. In the installation position, the securing ring 16 is supported on the associated contact surface 14 of the universal joint bush 13 by the contact surface 17 which likewise rises in a helix-shaped manner FIG. 1C illustrates the universal joint bush 13, designed according to the invention, in the installation position, i.e. pressed into the receptacle 5a of the universal joint yoke 19. The radially prestressed securing ring 16, which has a separating gap 33, is at the same time inserted in a radially prestressed manner and with a form fit into an annular groove 18 of the universal-joint yoke 19. The securing 16 is supported on the base 15 of the universal joint bush 13 via the contact surfaces 14, 17 which each run in a helix-shaped manner in opposite directions. The adjustable securing ring forms an inclination, for example, a helical inclination, in an axial direction and is supported, directly or indirectly, on a base of the universal joint bush via a further corresponding inclined plane. Rotation in the clockwise direction of the securing ring 16 causes a displacement of the universal joint bush 13 in relation to the universal-joint yoke 19 in the arrow direction. The securing ring 16 is rotated in a direction until compensation for the play and the required axial prestressing and a defined moment of inclination of the universal joint are achieved. In order to obtain optimum symmetry of the universal joint, it is appropriate to orient the universal joint bushes 13 centrally when pressing them in with respect to the universal joint axis, i.e. the axis of rotation of the universal joint 1, before the installation play on both sides of the universal-joint yoke 19 is compensated for individually via the rotatable securing rings 16.

The bearing arrangement 20 according to the invention as per FIG. 1C permits a play-free arrangement of the universal joint bush 13 in relation to the cross trunnion assembly 6 of the universal joint 1. At the same time, precise adjustment or setting of the cross trunnion assembly 6 can be achieved, in order to obtain a balanced and therefore vibration-free running of the universal-joint propeller shaft or of the shafts connected to the universal joint 1. The securing ring 16 is provided in each case on the end side in the region of the separating gap 33 with bores 21a, 21b into which, for example, a tool can be inserted in order to rotate the securing ring 16. To fix the position of the securing ring 16 in relation to the universal joint bush 13, knobs 22a, 22b which constitute an effective means of securing the securing ring 16 against rotation are integrally formed on the base 15 in the region of the contact surface 14. On the other hand, if removal of the bearing arrangement 20 is required, the knobs 22a, 22b are easily removable in order to permit removal of the bearing arrangement 20, during which the securing ring 16 is first of all rotated in the clockwise direction.

Figure 2:
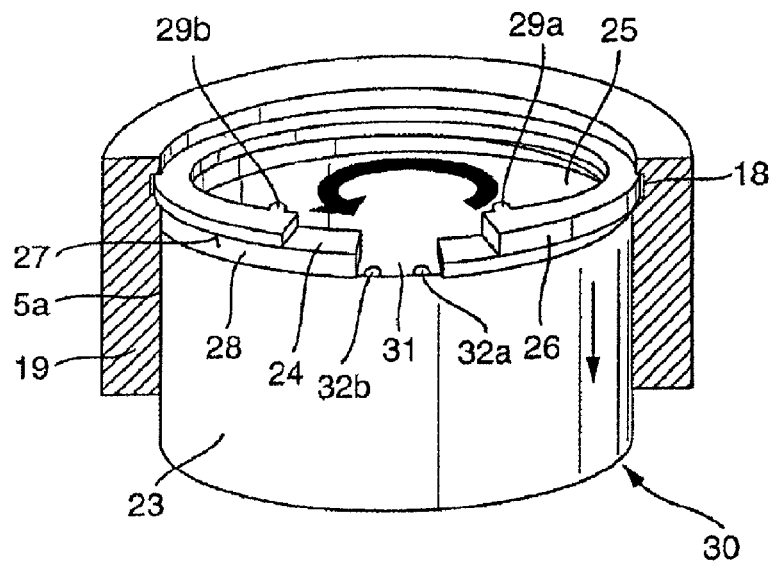
FIG. 2 shows a cutout of a universal joint, in which an intermediate ring is inserted between the securing ring and the base of the universal joint bush.

FIG. 2 shows the bearing arrangement 30 in which, in order to compensate for play, the securing ring 26 is operatively connected to the universal joint bush 23 via an intermediate ring 28. In this case, the securing ring 26 and the intermediate ring 28 are supported via contact surfaces 24 and 27 which are of helix-shaped design in opposite directions to each other. The intermediate ring 28 is supported on the smooth-faced, flat base 25 of the universal joint bush 23. In this case, the intermediate ring 28 has a separating gap 31 corresponding to the securing ring 26 and is inserted in a radially prestressed manner into the annular groove 18 of the universal-joint yoke 18. To fix the intermediate ring 28 in position, it is appropriate for two knobs 32a, 32b which project into the separating gap 31 to be integrally formed in the base 25. To adjust the play of the bearing arrangement 30, the securing ring 26 is rotated counterclockwise, as a result of which the universal joint bush 23 is displaced in the arrow direction. A simplified rotation of the securing ring 26 can be achieved by means of a tool (not depicted in FIG. 2) which interacts with two spaced-apart protrusions 29a, 29b of the securing ring 26.

REFERENCE NUMBERS

1 Universal joint
2 Yoke
3 Shaft
4a Yoke limb
4b Yoke limb
5a Receptacle
5b Receptacle
6 Cross trunnion assembly
7a Trunnion
7b Trunnion
7c Trunnion
8a Universal joint bush
8b Universal joint bush
9a Securing ring
9b Securing ring
10a Annular groove
10b Annular groove
11a Base
11b Base
12a Bearing arrangement
12b Bearing arrangement
13 Universal joint bush
14 Contact surface
15 Base
21b Bore
22a Knob
22b Knob
23 Universal joint bush
24 Contact surface
25 Base
26 Securing ring
27 Contact surface
28 Intermediate ring
29a Protrusion
29b Protrusion
30 Bearing arrangement
31 Separating gap
32a Knob
32b Knob
33 Separating gap
16 Securing ring
17 Contact surface
18 Annular groove
19 Universal-joint yoke
20 Bearing arrangement
21a Bore

The invention claimed is:

1. A bearing arrangement of a universal joint, the universal joint including two shafts, each shaft having a yoke at an end thereof, the shafts connected via a cross trunnion assembly, each trunnion of the cross trunnion assembly being guided in a cylindrical receptacle of the yoke, the bearing arrangement comprising:
   a universal joint bush positioned in the cylindrical receptacle and comprising a base end at an axial end of the universal joint bush;
   a radially prestressed securing ring inserted in an annular groove of the cylindrical receptacle and configured to define an installation position of the universal joint bush, the securing ring forming a surface inclined in the axial direction of the cylindrical receptacle; and
   the base of the universal joint bush supporting a contact surface inclined corresponding to the inclined surface of the securing ring and configured to support, directly or indirectly, the securing ring,
   wherein the contact surface is inclined so as to rise helically.

2. The bearing arrangement as claimed in claim 1, further comprising an intermediate ring positioned on the universal joint bush, wherein the securing ring is supported on the universal joint bush indirectly via the intermediate ring positioned and configured such that facing contact surfaces of the securing ring and of the intermediate ring correspondingly rise helically.

3. The bearing arrangement as claimed in claim 1, wherein the securing ring is a radially prestressed snap ring having a separating gap.

4. The bearing arrangement as claimed in claim 1, wherein the securing ring is sized and configured to be positioned in place, to be removed, to be adjusted and to be rotated.

5. The bearing arrangement as claimed in claim 4, the securing ring having bores configured to cause the securing ring to rotate when operated by a tool.

6. The bearing arrangement as claimed in claim 4, wherein the securing ring includes protrusions configured and positioned to be operated by a tool for rotating the securing ring.

7. The bearing arrangement as claimed in claim 1, further comprising knobs integrally formed at a separating gap, the knobs configured to rotationally fix the securing ring on the base of the universal joint bush.

8. The bearing arrangement as claimed in claim 1, further comprising:
    an intermediate ring positioned on the base of the universal joint and comprising the contact surface supported on the base; and
    knobs integrally formed at a separating gap, the knobs configured to rotationally fix the securing ring on the intermediate ring.

9. In combination, the bearing arrangement as claimed in claim 1 and the universal joint comprising the two shafts, each shaft comprising a yoke at an end of the shaft, the shaft connected via a cross-trunion assembly, each trunion of the cross-trunion assembly being guided in a cylindrical recepticle of the yoke.

10. A bearing arrangement of a universal joint, the universal joint including two shafts, each shaft having a yoke at an end thereof, the shafts connected via a cross trunnion assembly, each trunnion of the cross trunnion assembly being guided in a cylindrical receptacle of the yoke, the bearing arrangement comprising:
    a universal joint bush positioned in the cylindrical receptacle and comprising a base end at an axial end of the universal joint bush;
    a radially prestressed securing ring inserted in an annular groove of the cylindrical receptacle and configured to define an installation position of the universal joint bush, the securing ring forming a surface inclined in the axial direction of the cylindrical receptacle; and
    an intermediate ring positioned at the base of the universal joint bush and comprising a corresponding contact surface configured to cooperate with the inclined surface of the securing ring, the corresponding contact surface of the intermediate ring and the surface of the securing ring rising helically.

11. In combination, the bearing arrangement as claimed in claim 10 and the universal joint comprising the two shafts, each shaft comprising a yoke at an end of the shaft, the shaft connected via a cross-trunion assembly, each trunion of the cross-trunion assembly being guided in a cylindrical recepticle of the yoke.

* * * * *